United States Patent [19]

Snow

[11] 3,928,668
[45] Dec. 23, 1975

[54] ELECTROSTATIC DEPOSITION OF DRY CERAMIC POWDERS

[75] Inventor: Jerry D. Snow, Parma, Ohio

[73] Assignee: Ferro Corporation, Cleveland, Ohio

[22] Filed: May 6, 1974

[21] Appl. No.: 467,086

[52] U.S. Cl. .................... 427/14; 427/27; 427/226
[51] Int. Cl.² .................... B05B 5/02; B44D 1/094
[58] Field of Search ....... 117/17, 26, 100 S; 427/14, 427/27, 226; 101/DIG. 13

[56] References Cited
UNITED STATES PATENTS

| | | | |
|---|---|---|---|
| 3,400,000 | 9/1968 | Hoffman | 106/49 |
| 3,504,625 | 4/1970 | Childress | 117/18 |
| 3,617,379 | 11/1971 | Ulmer et al. | 117/17 |
| 3,795,313 | 3/1974 | Kirkland et al. | 210/502 |

*Primary Examiner*—Michael Sofocleous
*Attorney, Agent, or Firm*—Milton L. Simmons; Wesley B. Taylor

[57] ABSTRACT

A novel dry ceramic powder and process for its electrostatic deposition are disclosed, characterized in that the powder is coated with a liquid, curable organopolysiloxane which is polymerized to a solid form before the powder is deposited. Preferably, the polysiloxane is monosubstituted, leaving hydrogen linkages which react with surfaces of the particles comprising the ceramic powder and thereby chemically unite the polysiloxane with the particles. The present ceramic powder can be electrostatically deposited onto a substrate and retain an electrostatic charge for appreciable periods of time, even in environments having fairly high relative humidities, for example 75% and higher.

8 Claims, No Drawings

ELECTROSTATIC DEPOSITION OF DRY CERAMIC POWDERS

BACKGROUND OF THE INVENTION

The present invention relates to the deposition of ceramic powders, such as in porcelain enameling, in which glass particles or frit is deposited on a substrate and then fused by heat to form a ceramic coat. More particularly, the invention relates to the electrostatic deposition of such ceramic powder while maintained in a dry state.

For many years ceramic frit has been applied to a substrate or workpiece from an aqueous suspension. In practice, the vitreous frit has been wet-milled in the presence of a number of additives designed primarily to modify the rheological behavior of the suspension. The control of the rheology of porcelain enamel slips can be one of the more difficult problems met in producing acceptable ceramic coated products. Also in a wet process, the ware must be dried in a separate operation to remove the water prior to firing.

Electrostatic application of wet porcelain enamel slips or suspensions has been used. This process functions by applying an electrostatic charge to droplets of the suspension. A cloud of the charged droplets is sprayed toward the grounded ware to which it is electrostatically attracted and deposited. The charge on the droplets is immediately dissipated when they strike the ware, and it is only the rheological character of the slip which causes the droplets to remain in place as a film on the ware. Accordingly, many of the problems of wet application of ceramic slips still remain in this form of electrostatic deposition.

A dry deposition of ceramic powder would, therefore, be attractive in order to eliminate rheological problems, wet grinding, and other attendant wet process steps such as separate drying. Although the use of electrostatic charges for applying plastic, all-organic, powders to substrates has been suggested, it has not followed that this technique is readily transferrable to glass-based particles because of differences in the electrical characteristics of the respective powders involved. While plastic, all-organic powders are good electrical insulators, ceramic powders have considerably lower electrical resistivity. Also, there is no particular problem with the adhesion of all-organic thermoplastic articles to a substrate. Substrates coated with plastic particles can easily be handled and mechanically conveyed into an oven without flaking or other loss of the plastic particles.

The chief difference, therefore, in successfully depositing a ceramic powder onto a substrate, as contrasted with electrostatic deposition of a plastic, all-organic particle, lies in achieving a satisfactory adherence of the deposited ceramic powder to the substrate until firing can be carried out. In the case of electrostatic deposition, this problem takes the form of retaining an electrical charge on the powder for a sufficiently long time, so that the powder remains on the coated substrate until the substrate can be handled or otherwise processed through a firing operation.

Glass particles inherently have low electrical resistivity. An electrical charge easily leaks off such particles. Apparently any charge that may be temporarily retained on a ceramic particle resides principally on the surface of the particle, not unlike the Faraday effect. Loss of charge is hastened by any moisture present in ambient air. The situation becomes intolerable under conditions of high relative humidity, for example at 60% relative humidity and higher. As the relative humidity increases, it is believed that more of the alkali in the glass, such as sodium ions, are leached from the glass by the moisture to the surface of powder particles. Since the alkali ions are mobile, they decrease the electrical resistivity of the surface.

Previously, substrates electostatically coated with ceramic powder could be moved only with great care in order that the powder did not partially or entirely flake and fall free of the substrate. One technique suggested to surmount this problem has been to grind the ceramic powder to a fine size. The rationale was that the mechanical adhesion of powders to a substrate is proportional to the particle radius, while electrostatic removal forces are proportional to the square of the radius. Therefore, it was contended very fine particles would adhere better. This technique has not been entirely satisfactory, however, because, for example, of the difficulty to obtain the degree of fineness from grinding thought necessary. The slightest shaking or vibration can result in loss of some powder so that subsequent firing of the workpiece is useless. In addition to improving the retention of an electrostatic charge on ceramic powder after deposition on a substrate, a coating of a relatively high electrical resistivity on ceramic powder also enables use of a smaller amount of such coating, so that there is an economic savings.

In a related problem, white titania-containing ceramic powders are used to a great extent in coating metallic sanitary ware where the clean white color is euphemistically pleasing if not necessary to a purchasing public. Examples of such sanitary ware include bathtubs, washbowls, and other white ware like refrigerators and cooking utensils. Silicon coated frit was previously disfavored for this application, because silicone adversely affects the inherent properties of an opaque white titania ceramic enamel. There usually results, for example, a decreased reflectance, an increased blueness, and an increase in the incidence of bubble structure which detrimentally affects surface appearance.

It would, therefore, advance the art to provide an improved dry ceramic powder and a process for its electrostatic deposition.

SUMMARY OF THE INVENTION

The principal object of the present invention is to provide a dry ceramic powder and a process for its electrostatic deposition in which the ceramic powder has a relatively high electrical resistivity, for example at least about $10^{12}$ ohm-centimeters for at least 20 hours in an environment having a relative humidity of about 88%, and retains a charge for an appreciable period of time even when subjected to environments of high relative humidity and, in fact, is substantially independent of ambient relative humidity.

These and related objects are achieved by coating a ceramic powder prior to its electrostatic deposition with a liquid, curable organopolysiloxane and then polymerizing the polysiloxane on the powder to a solid form.

In one form, the liquid, curable organopolysiloxane has the formula:

(1) 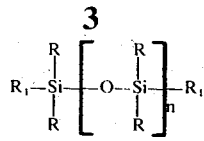

in which R represents monovalent substituents which may be the same or different and are selected from the group consisting of hydrogen, alkyl or cycloalkyl up to 6 carbon atoms, alkenyl or cycloalkenyl up to 6 carbon atoms, alkoxy up to 4 carbon atoms, and aryl or aralkyl up to 10 carbon atoms, $R_1$ is R or hydroxyl, and $n$ is a whole number sufficiently low to provide a liquid state at room temperatures, that is, from about 65°F to about 85°F.

The liquid, curable polysiloxane coats the ceramic powder and is then cured to a solid form. The polymerization can be carried out at room temperature or at elevated temperatures, or with a catalyst, or with combinations of elevated temperatures and catalyst. Enough polysiloxane is used that, after cure to a solid form, the ceramic powder contains from about 0.02% to about 2% by weight of the polysiloxane.

In the preferred practice, the polysiloxane is monosubstituted, leaving a substantial number of the R substituents as hydrogen. During polymerization or cure, the polysiloxane reacts through the hydrogen linkages with surfaces of the ceramic powder and chemically bonds the cured polysiloxane to the particles of the powder, meanwhile realeasing hydrogen as a gas.

The polysiloxane-coated ceramic powder can then be electrostatically deposited by standard means onto a substrate. The electrostatic charge is retained due to a high electrical resistivity on the ceramic powder of at least $10^{12}$ ohm-centimeters. The substrate need not be subsequently handled with undue care but can be conventionally processed for firing to fuse the ceramic powder into a ceramic coat.

DESCRIPTION OF THE PREFERRED EMBODIMENTS

In practicing one form of the present invention, a ceramic powder is coated with a liquid, curable organopolysiloxane after which the polysiloxane is polymerized on the powder to a solid form. The coated ceramic powder or frit is then electrostatically deposited on a substrate of a workpiece, such as conventional metallic ware, and the workpiece is fired to fuse the ceramic powder and form a coat.

Considering these aspects of the invention in greater detail, the composition of the ceramic powder is not critical. Any known glass composition previously used, for example, to manufacture frit can be employed. Often a silica base glass is used and this facilitates chemical interraction between the glass particles and the polysiloxane, as hereinafter described, although this is not necessary to the practice of the invention and one can obtain a chemical interraction between the glass and polysiloxane even though the glass is not silica based. The ceramic powder may also be pigmented if desired. Any of the usual refractory pigments may be employed such as titanium dioxide for a white color, the spinels for blue, black, brown, or green colors, cadmium sulfide for yellow color, and cadmium sulfoselenides for red and orange colors. The present invention is especially advantageous when used with white ceramic powders as hereinafter described. The particle size of the ceramic powder also is not critical, although desirably the powder is ground to a size suitable for electrostatic deposition, for example, sufficiently fine to pass about 325 U.S. Standard Sieve, but more often at least 85% through 200 U.S. Standard Sieve.

The polysiloxanes employed in the invention are those curable to a solid state. The polysiloxanes comprise linear chains having alternate silicon and oxygen atoms in which the silicon atoms bear monovalent substituents, usually organic. The particular curable organosiloxane used is not critical and may be any of those known in the art. Methods and techniques to prepare these polysiloxanes are also known in the art. The preferred polysiloxanes useful in the practice of the invention have the formula:

(1) 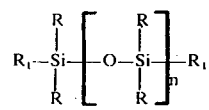

in which R represents monovalent substituents which may be the same or different and are selected from the group consisting of hydrogen, alkyl up to 6 carbon atoms, such as methyl, ethyl, propyl, butyl, etc.; cycloalkyl up to 6 carbon atoms, such as cyclopropyl, cyclohexyl, etc.; alkenyl up to 6 carbon atoms, such as vinyl, allyl, etc.; cycloalkenyl up to 6 carbon atoms, such as cyclohexenyl, etc.; alkoxy up to 4 carbon atoms, such as methoxy, ethoxy, etc.; aryl up to 10 carbon atoms, such as phenyl, tolyl, xylyl, naphthyl, etc.; aralkyl up to 10 carbon atoms, such as benzyl, phenylethyl, etc.; $R_1$ represents R and hydroxyl, and $n$ is a whole number sufficiently low to provide the liquid state. Usually, $n$ is a whole number within the range from about 5 to about 30 to produce the liquid form.

The substituents are connected to silicon atoms by carbon-silicon linkages except, of course, in the case of hydrogen which has a hydrogen-silicon linkage. Typical organopolysiloxanes include; methylhydrogen polysiloxane, dimethyl polysiloxane, methylallyl polysiloxane, methylphenyl polysiloxane, methylbenzyl polysiloxane, and the like. The desirable polysiloxanes are monosubstituted, and the preferred polysiloxane is methylhydrogen polysiloxane. All of the indicated polysiloxanes cure to a dry, solid, resinous coating having good hydrophobic properties. For the purpose indicated, polysiloxanes have been found to be superior to non-polymeric silicon-containing compounds.

Since the polysiloxane is liquid it is preferred to use it in this form without any added solvent or dispersing liquid. However, solvents such as acetone or benzene or non-aqueous dispersing liquids can be used, if desired, in the case of liquid polysiloxanes of relatively high molecular weight as compared, for instance, to methylhydrogen polysiloxane. The extent of the dilution depends on the surface properties desired. As indicated, it is preferred to use the siloxane as a liquid prepolymer, although the monomer can be used if desired.

The ceramic powder and liquid polysiloxane may be admixed by any convenient means such as tumbling the two components together. In fact, it is preferable to admix the polysiloxane with the ceramic powder while it is being milled to a desired particle size. However, it is also possible to mix the liquid polysiloxane with the ceramic frit prior to milling and even later after the milling has been completed. Not all of the ceramic powder need necessarily be coated. Enough polysiloxane is ordinarily used so that after cure of this material, the coated ceramic particles contain from about 0.02% to about 2% by weight of the polysiloxane.

After the siloxane has coated the ceramic powder, the siloxane may be polymerized to a solid state in any convenient manner. The polymerization may be carried out at room temperatures. No added catalyst is needed for moisture in the ambient air can initiate the reaction. However, this may take too long and to accelerate the reaction, elevated temperatures or an added catalyst or both can be added. Curing temperatures range from about 120° to about 300°C for about 1 minute to about 20 minutes. Usually a catalyst is present in an amount of 0.1 part to 3 parts of catalyst for 10 parts by weight of polysiloxane. Useful catalysts include zinc octoate, iron octoate, dibutyl tin dilaurate, stannous octoate, and the like.

A preferred modification of the present invention lies in chemically reacting the polysiloxane with the ceramic powder. Conveniently, this is accomplished at the same time the polysiloxane undergoes polymerization to a solid form. To facilitate the chemical reaction, the surface of the ceramic powder preferably has radicals reactive with the siloxane, such as hydrogen atoms on the polysiloxane. Since films of moisture are normally present on glass surfaces and since, it will be recalled, the present invention is especially adapted for use in environments of high humidity, there is an ample supply of moisture which results in the presence of hydroxyl groups on the surfaces of the glass particles of the ceramic powder. In the case of silica-based glasses, this may take the form of —Si—OH reactive sites. However, even when the glass is not based on silica, reactive sites can form which are reactive with the polysiloxane.

In a preferred form of the invention, the polysiloxane has reactive hydrogen atoms. Therefore, monosubstituted polysiloxanes are preferred, although not the entire one-half of the polymeric polysiloxane chain need be hydrogen-bearing. For example, sufficient chemical reaction takes place with the ceramic powder if about one-half of the monosubstituted polysiloxane has hydrogen, that is, if approximately one-fourth of the possible sites for substitution of the polysiloxane has hydrogen. Among the monosubstituted polysiloxanes, the preferred substituent is lower alkyl through $C_4$'s and especially methyl. In a preferred polysiloxane, about one-half of the R substituents (Formula 1) is hydrogen and one-half is methyl.

During the chemical reaction, the reactive hydrogen atoms of the polysiloxane split off and the silicon atoms of the polysiloxane become chemically bound directly with the glass surface of the ceramic powder. For example, in the case of a hydroxyl group on the surface of a silica-based glass, hydrogen gas is evolved from the hydrogen of the polysiloxane and the hydrogen of the hydroxyl group to leave a —Si—O—Si— chemical linkage between silicon atoms of the polysiloxane and the glass. In this manner, the polysiloxane is self-bonding to the ceramic powder and no binder is needed for this purpose.

The invention does not reside in any particular means of electrostatic deposition. Electrical guns, voltage and current conditions, and related techniques known in the art for electrostatic deposition can be used. The electrostatic spray gun disperses the charged coated ceramic powder as a cloud of particles which are directed by virtue of their charge and the output air pressure of the spray gun toward a grounded substrate. The substrate of a workpiece on which the deposition takes place is conveniently electroconducting, such as a grounded metal substrate like a steel panel. But the substrate need not be electroconducting. For example, a grounded, electroconducting plate can be placed behind a non-electroconducting substrate so as to attract the charged ceramic particles toward and onto such a substrate. Or an electroconducting screen (which can be a stencil screen) can be placed before a non-electroconducting substrate so as to attract and direct charged ceramic particles through the screen and onto the substrate. After the substrate has been coated with ceramic powder, it is fired by known and conventional processes to fuse the ceramic particles and provide a coat. The organic portions of the polysiloxane burn off during firing.

The following examples are intended only to illustrate the invention and should not be taken to impose limitations on the claims. Parts and percentages are by weight unless otherwise indicated.

EXAMPLE I

Working Example

Porcelain enamel frit was used having this general composition:

| Ingredient | Percent |
| --- | --- |
| $SiO_2$ | 40–45 |
| $B_2O_3$ | 16–20 |
| $Na_2O$ | 8–11 |
| $K_2O$ | 5–8 |
| $Li_2O$ | 0.5–2 |
| $TiO_2$ | 16–21 |
| F | 1–3 |
| $P_2O_5$ | 0.5–3 |
| MgO | 0.5–1 |
| ZnO | 0.6–1.4 |

An amount of 1000 grams of this frit and 5 grams of a liquid, curable polysiloxane were placed in a ball mill and dry ground for about 4.25 hours to reduce the frit particles to a point where they all passed a 70 mesh screen but four percent was retained on a 200 mesh screen (U.S. Standard Screen sizes). The liquid polysiloxane could be added to the frit either during the milling operation or subsequent to it.

The polysiloxane used consisted essentially of methylhydrogen polysiloxane and is one manufactured by Dow Corning under the trade designation "DC-1107" in which the R's of Formula 1 are substantially equally divided between methyl and hydrogen. Typical properties of this polysiloxane are:

| | |
| --- | --- |
| Viscosity at 77°F | 30 |
| % Hydrogen | 1.65 |
| Specific Gravity at 77°F | 1.0 |
| Refractive Index | 1.3962 |
| Percent Silicone | 100 |
| Flash Point, Open Cup, Degrees F | 250 |
| Acid Number | less than 0.02 |
| Color | water white |

The coated frit particles were heated at about 200°C for about 10 minutes which polymerized the polysiloxane to a solid form. The cured polysiloxane amounted to about 0.5% by weight of the heated particles as determined by standard carbon analysis techniques.

In this and the following examples the resistivity of the ceramic powders was determined as follows. Approximately 6 grams of the powder were placed in a 1.25 inch die and pressed under 16,000 psi into the form of disks. These disks were then placed in 4 ounce size glass, each of which contained a solution selected from the International Critical Tables to provide a predetermined level of relative humidity in the space above the solution. The disks of ceramic powder did not touch the solutions but were exposed to the relative humidity generated by them in the jars. The disks of ceramic powder were left in the jars of controlled relative humidity for 20 ± 5 hours, after which they were removed and their resistivity measured within 3 minutes after removal.

Resistivity measurements were made using a test fixture with platens of 3.1 cm² area under laboratory conditions of 71 ± 3°F, and 40 ± 20% relative humidity. An applied direct current potential of 300 volts, supplied by a Kepco model ABC 1500 M power supply, was impressed across the disk and the resulting current measured with a Keithley Model 610 C feedback type picoammeter. An electrification time of 2 minutes was used.

The ceramic powder obtained in this example had the following resistivity values:

Exposure for Approximately 20 Hours to Relative Humidities of:

|  | 66% | 79% | 88% | 95% |
|---|---|---|---|---|
| Resistivity (ohm-cm) | >1.8 × 10$^{15}$ | 8.6 × 10$^{14}$ | 1.1 × 10$^{15}$ | 5.3 × 10$^{14}$ |

The ceramic powder of this example was electrostatically sprayed using a Nordson Model NPE-1A spray gun, operated at 90 kilovolts, onto a 6 in. × 6 in. panel of decarburized steel to a weight of 8 grams. The resulting coating withstood jarring of the panel without becoming detached. The panel was then fired at 1350°F for 3.5 minutes to fuse the powder and form a ceramic coat. No problems were encountered in application of the powder, its adherence to the panel, handling the sprayed panel, firing, or in properties of the final ceramic coat, such as surface appearance, bond (adherence), chemical durability, reflectance or color.

EXAMPLE 2

This example illustrates the inferior results obtained when the surface coating of the present invention is omitted. The frit of Example 1 was dry ground in the same manner as for that example, except that no polysiloxane was used. After milling, the ceramic powder passed a 70 mesh U.S. Standard screen but 0.5 percent was retained on a 200 mesh. The resistivity of the powder was determined as in Example 1. The resistivity of the powder immediately after being removed from the mill was 1.0 × 10$^{13}$ ohm-cm, but after 20 hours' exposure to various relative humidity levels, samples of the powder gave the following results:

20 Hours Exposure to Relative Humidities of:

|  | 32% | 66% | 88% |
|---|---|---|---|
| Resistivity (ohm-cm) | 8.0 × 10$^{8}$ | 4.5 × 10$^{7}$ | 9.2 × 10$^{6}$ |

This powder was sprayed under dry conditions (14% relative humidity) with a GEMA Model 720 electrostatic spray gun, operated at 70 kilovolts, onto a steel panel. It proved impossible to apply a full thickness of ceramic powder without defects. Adherence of the powder to the panel was very poor and only a slight jarring was needed to dislodge it.

EXAMPLE 3

This example and the next example illustrate the improvement in resistivity obtained when the polysiloxane-coated powder is heat-treated after the coating operation. The frit of Example 1 was milled until the resulting powder passed a 70 mesh U.S. Standard screen but 15% of the powder was retained on a 200 mesh screen. Approximately 100 grams of the milled powder was placed in a quart jar together with 0.0625 grams of a liquid polysiloxane (DC-1107). The two components were blended together by shaking the closed jar on a paint shaker machine for 30 minutes. No catalyst or reaction accelerator was used. Half of the powder so prepared was heat treated for 10 minutes at 200°C, and the remaining half had no further treatment. Both portions of powder were dusty with excellent flowability. The two portions had the following resistivity data:

| 20 Hours Exposure to Relative Humidities of: | Resistivity (ohm-cm) | |
|---|---|---|
| | As Blended | After Heat Treatment |
| 79% | 7.5 × 10$^{13}$ | 1.5 × 10$^{14}$ |
| 88% | 1.2 × 10$^{13}$ | 6.2 × 10$^{13}$ |
| 95% | 1.3 × 10$^{11}$ | 2.7 × 10$^{12}$ |

EXAMPLE 4

A frit composition of Example 1 was milled with 0.0625% by weight of the frit of the same liquid polysiloxane of Example 1 for 4.25 hours. During the last 0.25 hour of milling 0.002% by weight of the frit of a reaction accelerator was added comprising a basic amino silane, although this addition is not essential. The mill was charged and dumped under 35% relative humidity. The resultant powder passed a 70 mesh U.S. Standard screen but 2% of the powder was retained on a 200 mesh screen. Half of the powder was heat treated as in Example 3 and half was not. The two portions had the following resistivity data:

| 20 Hours Exposure to Relative Humidities of: | Resistivity (ohm-cm) | |
|---|---|---|
| | As Milled | After Heat Treatment |
| No exposure | ≈1 × 10$^{15}$ | ≧1.3 × 10$^{15}$ |
| 79% | — | 2.1 × 10$^{14}$ |
| 88% | 3.5 × 10$^{12}$ | 1.8 × 10$^{14}$ |
| 95% | 2.3 × 10$^{10}$ | 4.9 × 10$^{10}$ |

EXAMPLE 5

This and the following two examples illustrate the superiority of results from using a polysiloxane of the present invention as compared with using other non-polymeric silicon-containing materials.

A procedure like that of Example 4 was carried out except that in place of the polysiloxane a much larger amount, 0.5%, of diphenylsilanediol was used. The resultant powder passed a 70 mesh U.S. Standard screen but 6% was retained on a 200 mesh screen. The powder which was not heat treated had the following resistivities:

|  | 15 Hours Exposure to Relative Humidities of: | | |
| --- | --- | --- | --- |
|  | 45% | 66% | 79% |
| Resistivity (ohm-cm) | $3.5 \times 10^{13}$ | $4.4 \times 10^{12}$ | $2.3 \times 10^{11}$ |

In comparing the resistivity data of Examples 4 and 5, it is clear that the polysiloxane of the present invention produced powder (both as milled and heat treated) having substantially higher resistivities at high humidities, even though the polysiloxane was used at only one-eighth the concentration of the diphenylsilanediol. Consequently, as one advantage, the polysiloxane is much more economical in use in that less is needed to protect the ceramic powder from the degrading effect that atmospheric water vapor has on the resistivity of the electrostatic powders. The resistivity data of Example 4 indicate that 0.0625% of the polysiloxane produces powders of equal or higher resistivity than $1 \times 10^{12}$ ohm-cm at relative humidities to about 90%. By contrast if the data of Example 5, for the dephenylsilanediol coated powders are plotted, the graph shows resistivities below $1 \times 10^{12}$ ohm-cm when the relative humidity exceeds about 70%. Thus, under humid conditions frequently encountered in plants, especially during the summer months, polysiloxane-coated powders work satisfactorily while the diphenylsilanediol-coated powders do not.

EXAMPLE 6

A Further advantage of the polysiloxanes, as compared to non-polymeric silicone containing materials, can be shown in the improved reflectance obtained with fired surfaces of the former.

A portion of the powder from Example 5 was electrostatically sprayed with a GEMA Model 720 spray gun onto 6 in. × 8 in. steel panels that had been conventionally coated and fired with a "ground coat", 4 mils thick, although the use of a ground coat is not necessary. A total powder weight of 12 grams was applied. The coated panels were fired for 4 minutes at 1360°F. The average reflectance of three panels so prepared was 75.3%, measured with a Gardner Model XL-10 reflectometer.

A portion of each of the "as-milled" and "heat-treated" powders of Example 4 were similarly sprayed and fired. Reflectances in this case were 78.0% for the as-milled powder and 77.3% for the heat-treated powder. These significantly higher reflectances were made possible at least in part, because the superior properties of the polysiloxane coating made it possible to use only one-eighth as much of it as was needed of the diphenylsilanediol.

EXAMPLE 7

This example also illustrates the advantages of a polysiloxane over a non-polymeric silicone material like diphenylsilanediol. Two frits were used in this example. Frit A was of the composition given in Example 1. Frit B was a soft, easily leachable ground coat, properties which make it normally a very difficult material to apply electrostatically.

| Frit B | |
| --- | --- |
| Oxide | Weight Percent |
| $SiO_2$ | 26–31 |
| $B_2O_3$ | 19–24 |
| $Na_2O$ | 14–17 |
| $K_2O$ | 1–3 |
| $Li_2O$ | 1–3 |
| F | 1–3 |
| $P_2O_5$ | 0.5–2 |
| ZnO | 2–4 |
| CaO | 9–12 |
| BaO | 3–5 |
| $Al_2O_3$ | 2–4 |
| $ZrO_2$ | 1–3 |
| $Co_2O_3$ | 0.5–1.5 |
| NiO | 1–2.5 |
| $MnO_2$ | 0.25–1.5 |
| CaO | 0.5–2 |

Two mills of Frit A were prepared. In one, 0.5% of the polysiloxane of Example 1 (DC-1107) was added, while in the other 0.5% diphenylsilanediol was added. Similarly, two mills were set up for Frit B, one with 0.5% DC-1107 and the other with 0.5% diphenylsilanediol. Each mill was turned for about 4 hours. Each resulting powder passed a 70 mesh U.S. Standard screen, but 2 to 8% was retained on a 200 mesh screen. The resistivities of these four lots of powder after exposure to high levels of relative humidity and tested as previously described were:

| | | Resistivity (ohm-cm) after 15 to 20 Hrs Exposure to Relative Humidities of: | | |
| --- | --- | --- | --- | --- |
| Frit | Coating | 66% | 79% | 95% |
| A | Diphenylsilanediol | $4.3 \times 10^{12}$ | $2.3 \times 10^{11}$ | $3.7 \times 10^7$ |
| B | Diphenylsilanediol | $1.8 \times 10^9$ | $1.3 \times 10^8$ | $1.4 \times 10^7$ |
| A | Methylhydrogen polysiloxane | $1.3 \times 10^{16}$ | $5.0 \times 10^{14}$ | $1.3 \times 10^{13}$ |
| B | Methylhydrogen polyxiloxane | $1.5 \times 10^{14}$ | $4.8 \times 10^{11}$ | $1.1 \times 10^9$ |

The data clearly show that the polysiloxane is superior to the silanediol in terms of maintaining electrical resistivity of the coated ceramic powders. Because it is so much better in this respect, the polysiloxane can be used in lesser amounts than can the silanol and still adequately protect the frit from the degrading effects of atmospheric water vapor. It has been found that as little as 0.1 wt. % of the methylhydrogen polysiloxane is adequate for use, especially with titania enamels.

EXAMPLE 8

It has been found that still higher resistivities can be achieved with the polysiloxanes if the ceramic powder coated with such material is given a heat treatment after the coating is applied. This additional procedure apparently facilitates a final and tighter cure and binding of the polysiloxane polymer to the surface of the ceramic powder. As an illustration, the ceramic powders of Example 7 having the polysiloxane coating were given a 10 minute heat treatment at 200°C. After this treatment the electrical resistivities were as follows:

| Oxide | Frit D - % | Frit E - % |
| --- | --- | --- |
| $Al_2O_3$ | 0.1 to 2.0 | — |
| $B_2O_3$ | 12.2 to 15.8 | 0.8 to 3.7 |
| CdO | 2.5 to 4.7 | 2.2 to 4.1 |
| PbO | 58 to 66 | — |
| $SiO_2$ | 4 to 7 | 37.3 to 44.4 |
| ZnO | 15 to 19 | — |
| $ZrO_2$ | 0.2 to 1.5 | — |
| BaO | — | 0.5 to 3.5 |
| CaO | — | 0.9 to 2.2 |
| $K_2O$ | — | 10.7 to 14.4 |
| $Li_2O$ | — | 2.6 to 5.8 |
| $Na_2O$ | — | 11.8 to 16.0 |
| $P_2O_5$ | — | 0.3 to 1.9 |
| $TiO_2$ | — | 15.2 to 18.2 |
| $SnO_2$ | — | 2.0 to 4.1 |

| | | Electrical Resistivity (ohm-cm) After Exposure for 18 to 21 Hours to Relative Humidities of: | | |
| --- | --- | --- | --- | --- |
| Frit | Coating | 66% | 79% | 95% |
| A | 0.5 wt. % methylhydrogen polysiloxane | >$1.8 \times 10^{15}$ | $8.6 \times 10^{14}$ | $5.3 \times 10^{14}$ |
| B | 0.5 wt. % methylhydrogen polysiloxane | $3.5 \times 10^{14}$ | $2.3 \times 10^{13}$ | $6.6 \times 10^{8}$ |

EXAMPLE 9

The ceramic powders useful in the present invention include not only totally glassy powders but also those that are at least partially crystalline. As an illustration, Frit C of the composition listed below was electrostatically applied after being ball milled with 0.125% of the liquid polysiloxane of Example 1. This frit is semicrystalline in nature and becomes more crystalline during firing. It is used as a porous coating in home ovens of the "continuous cleaning" type.

| Frit C | |
| --- | --- |
| Oxide | Weight Percent |
| $B_2O_3$ | 1.0 to 5.0 |
| CaO | 0.1 to 2.0 |
| $K_2O$ | 5.0 to 7.0 |
| $Li_2O$ | 0.75 to 2.0 |
| $MnO_2$ | 25.0 to 35.0 |
| $Na_2O$ | 1.5 to 3.0 |
| $P_2O_5$ | 0.2 to 1.0 |
| $Sb_2O_3$ | 7.2 to 11.2 |
| $SiO_2$ | 28.5 to 35.5 |
| ZnO | 3.0 to 4.7 |
| $TiO_2$ | 6.0 to 8.5 |

After milling the frit and polysiloxane together the powder passed a 70 mesh U.S. Standard screen while 0.2% was retained on a 200 mesh screen. This powder was electrostatically sprayed with a Nordson Model NPE-1A electrostatic spray gun onto steel sheets that had been previously coated with a known ground or base coat and then fired in a conventional manner. The powder sprayed very well and had good adherence to the substrate. After a 4 minute fire at 1500°F, the coating had the requisite level of porosity and was tested and found to be an efficient cleaning surface for typical oven soils.

EXAMPLE 10

In addition to steel or iron substrate, still other substrates may be used. As an illustration, two typical enamels used on aluminum were:

These frits were charged into mills with 0.125% of the polysiloxane of Example 1 and milled for 5 hours. After that time, a trace (~0.1%) of the powders was coarser than 325 mesh, U.S. Standard screen size. As before, the resistivities of the resulting powders was measured using the techniques of Example 1. Disks were made and tested immediately after the milling operation and at a relative humidity between 30 and 40%.

| Frit | Coating | As Milled Resistivity (ohm-cm) |
| --- | --- | --- |
| D | 0.125% methylhydrogen polysiloxane | $2 \times 10^{15}$ |
| E | 0.125% methylhydrogen polysiloxane | $3.2 \times 10^{12}$ |

The powders were electrostatically sprayed with a Nordson gun onto 4 in. × 6 in. panels of 3003 aluminum. Application weight for the powders was 3.5 grams. Both coatings were fired for 10 minutes at 1100°F. The appearance properties of the fired coat were quite acceptable.

In addition to the foregoing, when opaque titania-containing ceramic powders are treated generally with non-polymeric silicone-containing materials, the resultant ceramic coating is low in reflectance, excessively bluish, and has too much bubble structure with associated surface defects. These deficiencies become more pronounced as the level of the silicone-containing material is increased. Polysiloxane-coated ceramic powders of the present invention are least susceptible to these faults and, accordingly, their use substantially minimizes the described unwanted results.

While the foregoing describes several embodiments of the present invention, it is understood that the invention may be practiced in still other forms within the scope of the following claims.

I claim:

1. An improved process for forming a ceramic coat on a substrate by electrostatically depositing thereon a ceramic powder having an extended retention time of an electric charge, comprising:

a. coating said ceramic powder with a liquid, curable organopolysiloxane having the formula:

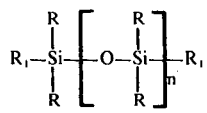

in which R represents monovalent substituents which may be the same or different and are selected from the group consisting of hydrogen, alkyl or cycloalkyl up to 6 carbon atoms, alkenyl or cycloalkenyl up to 6 carbon atoms, alkoxy up to 4 carbon atoms, and aryl or arakyl up to 10 carbon atoms, $R_1$ represents R and and hydroxyl, at least about one-fourth of said R substituents is hydrogen, and n is a whole number within the range from about 5 to about 30, b. polymerizing the polysiloxane on said powder to a solid state to form a powder having a resistivity of at least about $10^{-12}$ ohm-cm in an environment having a relative humidity of about 88%, c. electrostatically depositing the polysiloxane coated ceramic powder substantially uniformly over a portion of said substrate substantially at ambient room temperature, d. subjecting said substrate to physical movement which but for the polysiloxane coating on the ceramic powder would dislodge some of said powder from the substrate, and e. heating the substrate to fuse the ceramic powder and form thereover a substantially uniform ceramic coat.

2. The process of claim 1 in which said substrate is metallic.

3. The process of claim 1 in which said resistivity of at least about $10^{-12}$ ohm-cm is maintained for at least 20 hours in the environment having a relative humidity of about 88%.

4. The process of claim 1 in which at least half of said R substituents is hydrogen, and said polymerization of the polysiloxane includes reacting the polysiloxane through its hydrogen linkages with the ceramic powder.

5. The process of claim 4 in which at least half of said R monovalent substituents is hydrogen and the balance is methyl, and said reaction step comprises reacting the hydrogen substituents with hydroxyl groups on said ceramic powder.

6. The process of claim 1 in which polymerizing said polysiloxane includes heating the coated ceramic powder.

7. The process of claim 1 in which polymerizing said polysiloxane includes heating the coated ceramic powder at a temperature within the range of about 125°C to about 300°C for about 1 minute to about 20 minutes.

8. The process of claim 1 in which said coated ceramic particles contain from about 0.02% to about 2% by weight of the polysiloxane.

* * * * *

UNITED STATES PATENT OFFICE
CERTIFICATE OF CORRECTION

PATENT NO. : 3,928,668
DATED : December 23, 1975
INVENTOR(S) : Jerry D. Snow

It is certified that error appears in the above-identified patent and that said Letters Patent are hereby corrected as shown below:

Claim 1, line 21, "$10^{-12}$" should read -- $10^{12}$ --.

Claim 3, line 7, "$10^{-12}$" should read -- $10^{12}$ --.

*Signed and Sealed this*

*twenty-fifth* Day of *May 1976*

[SEAL]

Attest:

RUTH C. MASON
*Attesting Officer*

C. MARSHALL DANN
*Commissioner of Patents and Trademarks*